United States Patent
Kono et al.

(10) Patent No.: US 11,087,600 B2
(45) Date of Patent: Aug. 10, 2021

(54) DISPLAY CONTROL METHOD, DISPLAY CONTROLLER, AND STORAGE MEDIUM

(71) Applicant: YOKOGAWA ELECTRIC CORPORATION, Tokyo (JP)

(72) Inventors: Ayako Kono, Tokyo (JP); Yuya Iketsuki, Tokyo (JP); Naotaka Nogawa, Tokyo (JP); Motoichi Kuwatani, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 15/930,475

(22) Filed: May 13, 2020

(65) Prior Publication Data

US 2020/0364993 A1 Nov. 19, 2020

(30) Foreign Application Priority Data

May 16, 2019 (JP) .............................. JP2019-092998

(51) Int. Cl.
*G06T 1/00* (2006.01)
*G08B 5/22* (2006.01)
*G09G 5/00* (2006.01)

(52) U.S. Cl.
CPC .............. *G08B 5/22* (2013.01); *G06T 1/0021* (2013.01); *G09G 5/00* (2013.01)

(58) Field of Classification Search
CPC . G06T 2207/20212; G06T 2207/20221; G06T 1/0021; G06T 2207/24091; G06T 2219/24092

See application file for complete search history.

(56) References Cited

U.S. PATENT DOCUMENTS

| 7,702,782 B1* | 4/2010 | Pai ........................ G06F 11/327 709/224 |
| 2006/0041848 A1* | 2/2006 | Lira ..................... G06Q 10/107 715/805 |
| 2013/0147630 A1 | 6/2013 | Nakaya |

FOREIGN PATENT DOCUMENTS

| CN | 103163876 A | 6/2013 |
| JP | H08339225 A | 12/1996 |
| JP | 2011204202 A | 10/2011 |

OTHER PUBLICATIONS

Toshiaki Takahashi, "Provision of Integration Control System Organized around Production Control System", [online], Nov. 2007, Yokogawa Electric Corporation, [searched on Apr. 15, 2019], the Internet<URL: https://partner.yokogawa.com/japan/dcs/pdf/keiso/dcs-keiso-2007_11ja.pdf>.

(Continued)

*Primary Examiner* — Antonio A Caschera

(57) ABSTRACT

A display control method including selecting an indicator image corresponding to a display attribute which is set for a display area, and performing display control for displaying each alarm corresponding to the display attribute among alarms generated in a plant and also displaying the selected indicator image collectively in the display area.

13 Claims, 12 Drawing Sheets

(56) References Cited

OTHER PUBLICATIONS

Office Action issued for counterpart Japanese Application No. 2019-092998, issued by the Japan Patent Office on Jun. 11, 2019 (drafted on Jun. 6, 2019).

Grant Decision issued for counterpart Japanese Application No. 2019-092998, issued by the Japan Patent Office on Sep. 17, 2019 (drafted on Sep. 12, 2019).

Notice of First Office Action for Patent Application No. 202010285356.X, issued by the National Intellectual Property Administration of the People's Republic of China dated Feb. 3, 2021.

* cited by examiner

DISPLAY CONTROL METHOD, DISPLAY CONTROLLER, AND STORAGE MEDIUM

The contents of the following Japanese patent application(s) are incorporated herein by reference:
NO. 2019-092998 filed in JP on May 16, 2019

BACKGROUND

1. Technical Field

The present invention relates to a display control method, a display controller, and a recording medium.

2. Related Art

Up to now, in a case where various alarms generated in a plant are to be displayed, an attribute and the like of the alarms is displayed using a character string on a title bar provided on a frame that defines a display area (for example, see Non-Patent Literature 1). Non-Patent Literature 1: Toshiaki Takahashi, "Provision of Integration Control System Organized around Production Control System", [online], November 2007, Yokogawa Electric Corporation, [searched on Apr. 15, 2019], the Internet <URL: https://partner.yokogawa.com/japan/dcs/pdf/keiso/dcs-keiso-2007_11ja.pdf>

However, since the title bar has a small display size and is located outside the display area, it is difficult to understand the attribute of the alarms.

SUMMARY

To address the above-described issue, a display control method is provided according to a first aspect of the present invention. The display control method may include selecting an indicator image corresponding to a display attribute which is set for a display area. The display control method may include displaying, in the display area, each alarm corresponding to the display attribute among alarms generated in a plant and also collectively displaying, in the display area, the selected indicator image.

The displaying may include displaying the selected indicator image as a watermark image.

The display control method may include setting a plurality of the display attribute for the display area. The displaying may include displaying, in the display area, each alarm corresponding to all of the plurality of display attributes of the display area.

The selecting may include selecting, for the display area, each indicator image corresponding to the plurality of display attributes which is set for the display area. The controlling may include collectively displaying, in the display area, each of the plurality of indicator images selected for the display area.

The selecting may include selecting an indicator image corresponding to a display attribute of each of a plurality of display areas including the display area. The controlling includes displaying, in each of the plurality of display areas, each alarm corresponding to the display attribute of the display area and also displaying, in each of the plurality of display areas, the indicator image selected for the display area.

The display control method may include setting the display attribute for each of the display areas.

The setting may include setting a plurality of the display attributes for each of at least a part of display areas among the plurality of display areas. The controlling may include displaying, in each of at least the part of the display areas, each alarm corresponding to all of the plurality of display attributes of the display area.

The selecting may include selecting, for each of at least the part of the display areas, an indicator image corresponding to each of the plurality of display attributes which is set for the display area. The controlling may include collectively displaying, in each of at least the part of the display areas, each of a plurality of the selected indicator images for the display area.

The setting may include setting a common display attribute for each of two or more of the display areas among the plurality of display areas.

The controlling may include collectively displaying, in each of the two or more of the display areas, each indicator image corresponding to a unique display attribute among each display attribute of the display area.

The controlling may include displaying the common display attribute in a region different from each of the two or more of the display areas.

The setting may include collectively setting the common display attribute for each of the two or more of the display areas in response to a user operation.

The setting may include selecting whether to set the display attribute individually or to set the display attribute collectively for the two or more of the display areas in response to a user operation.

The display control method may include obtaining an alarm generated in the plant. The display control method may include detecting a communication failure on an alarm obtaining route. The display control method may include displaying an indicator image corresponding to the communication failure in the display area in a case where the communication failure is detected.

According to a second aspect of the present invention, there is provided a display controller. The display controller may include a selection unit configured to select an indicator image corresponding to a display attribute which is set for a display area. The display controller may include a display control unit configured to display, in the display area, each alarm corresponding to the display attribute among alarms generated in a plant and also to collectively display, in the display area, the selected indicator image.

According to a third aspect of the present invention, there is provided a recording medium that records a program. The program may cause a computer to function as a selection unit configured to select an indicator image corresponding to a display attribute which is set for a display area. The program may cause the computer to function as a display control unit configured to display, in the display area, each alarm corresponding to the display attribute among alarms generated in a plant and also to collectively display, in the display area, the selected indicator image.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described by way of an embodiment of the invention, but the following embodiment is not limited to the invention described in the scope of claims. In addition, not all of combinations of features described in the embodiment are necessarily essential to solving means of the invention.

[1. Configuration of Plant Management System]

Figure 1:
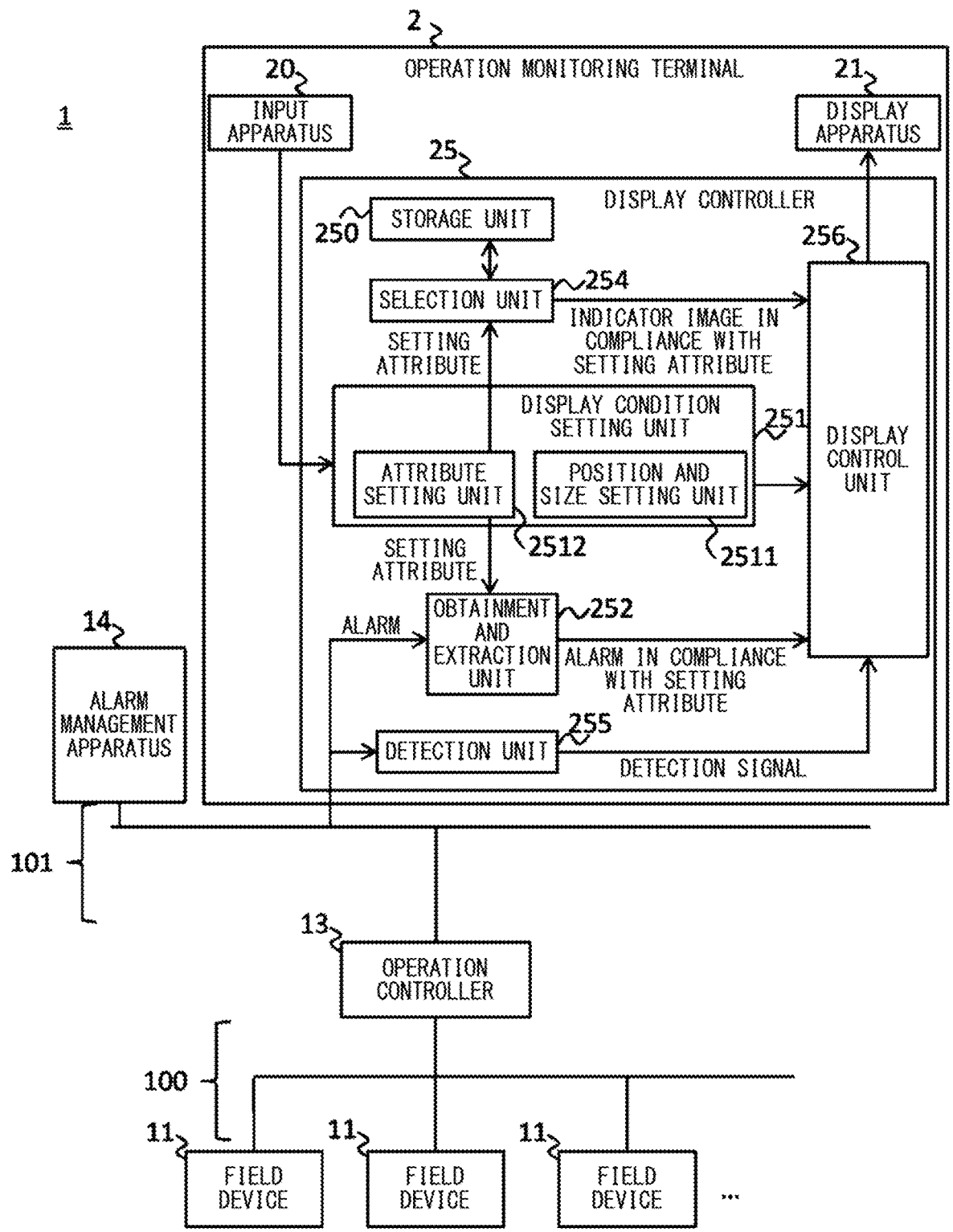
FIG. 1 shows a plant management system 1 according to the present embodiment.

FIG. 1 shows a plant management system 1 according to the present embodiment. The plant management system 1 is configured to perform an operation management of a plant, and includes a plurality of field devices 11, an operation controller 13, an alarm management apparatus 14, and an operation monitoring terminal 2. According to the present embodiment, in one example, each of the field devices 11 may be arranged in a field site where processes are executed in the plant. For example, a pipe through which a fluid to be measured is caused to flow, a flowmeter that is arranged in the pipe and measures a flow rate of the fluid, and the like exist in the field site. The operation controller 13, the alarm management apparatus 14, and the operation monitoring terminal 2 may be arranged in an administrative room, an instrument room, or the like in the plant. It is noted that the plant includes, for example, a factory facility, a machinery facility, a production facility, a power generation facility, a storage facility, and a facility at a well site for extracting oil, natural gas, and the like.

[1-1. Field Device]

The plurality of field devices 11 are equipment, machinery, or an apparatus, and may also be, for example, a sensor that measures a physical amount such as a pressure, a temperature, a pH, a speed, or a flow rate in the process in the plant, or may also be an actuator such as a valve, a pump, a fan, or a motor that controls any of physical amounts. Each of the field devices 11 among the plurality of field devices 11 may also be mutually different types, or two or more of at least a part of the field devices 11 may also be the same type.

The field devices 11 may be connected to the operation controller 13 in a wired or wireless manner via a control network (a field network, a fieldbus network) 100. A communication in the control network 100 may also be an analog communication or a digital communication, or may also be a hybrid communication in which a digital signal is superimposed on an analog signal (signal at 4 to 20 mA or the like). The communication in the control network 100 may be performed, for example, by a wireless communication protocol of ISA (International Society of Automation). In one example, the communication may be performed by ISA100, HART (Highway Addressable Remote Transducer) (registered trademark), BRAIN (registered trademark), FOUNDATION Fieldbus, PROFIBUS, or the like. The field device 11 may include unique identification information (also referred to as device specific information).

[1-2. Operation Controller]

The operation controller 13 communicates with each of the field devices 11 to control processes. For example, the operation controller 13 obtains a process value from the field device 11 serving as a sensor, and drives the field device 11 serving as an actuator. The operation controller 13 may supply the process value to the operation monitoring terminal 2, and receive a target value of the process value from the operation monitoring terminal 2. It is noted that according to the present embodiment, in one example, descriptions will be provided while the single operation controller 13 is included in the plant management system 1 and is configured to control all of the field devices 11, but the plurality of operation controllers 13 may also be included and configured to perform distributed control on each part of the field devices 11. The operation controller 13 may be, for example, a control controller (in one example, a product of Yokogawa Electric Corporation "FCS" (Field Control Station).

The operation controller 13 may output alarms generated in the plant. For example, the operation controller 13 may output a message of a system alarm in a case where an anomaly of the field device 11 or another device in the plant management system 1 is detected. In addition, in a case where an anomaly of the process is detected from a fluctuation of the process value measured by the field device 11, the operation controller 13 may output a message of a process alarm.

[1-3. Alarm Management Apparatus]

The alarm management apparatus 14 manages the alarms. For example, the alarm management apparatus 14 may store the alarms output from the operation controller 13. The alarm management apparatus 14 may also generate alarms caused in the plant instead of the operation controller 13 or in addition to the operation controller 13. The alarm management apparatus 14 may also determine the presence or absence of an authority for accessing alarm information stored therein by performing an authentication or the like of a device (in one example, the operation monitoring terminal 2) connected to the alarm management apparatus 14 or an operator of the device.

Herein, each alarm stored in the alarm management apparatus 14 may include, or may be associated with, various detail information (also referred to as alarm attributes). The detail information of the alarm may also be generated by the operation controller 13, may also be generated by the operation monitoring terminal 2, or may also be generated by the alarm management apparatus 14. In addition, after the detail information of the alarm is generated by the operation controller 13, the detail information may be modified by the operation monitoring terminal 2 or the alarm management apparatus 14.

For example, the detail information of the alarm may be a type of the alarm (according to the present embodiment, in one example, any one of the system alarm and the process alarm), a use of the alarm (in one example, operation (control) or maintenance), device specific information of the device that has generated the alarm, a model number of the device, information with regard to a generation location (in one example, which may be at least one of the device specific information, a generation section (which may also be referred to as a generation area)), a time of the generation, or other states of the device that has generated the alarm. Other information may be, for example, at least one of whether or not the generated alarm has been already handled, whether or not the handing is shelved (also referred as suspension and shelving), or whether or not the display is suppressed (also referred as alarm suppression). The detail information of the alarm may also include information indicating a communication failure or break-down of a device.

According to the present embodiment, in one example, among the detail information of the alarm, the type of the alarm, the device specific information, the model number of the device, the generation section, and the generation time may be generated by the operation controller 13. Among the detail information of the alarm, the information on whether or not the generated alarm has been already handled, whether or not the handing is shelved, and whether or not the display is suppressed may be generated by the operation monitoring terminal 2.

It is noted that the alarm management apparatus 14 may be a personal computer (PC) in one example. The alarm management apparatus 14 and the operation monitoring terminal 2 may be connected to the operation controller 13 via a network (control bus network) 101. The network 101 may be the Internet or a dedicated-use circuit, in one example. The alarm management apparatus 14 may be connected to another device via a firewall that is not shown in the drawing.

[1-4. Operation Monitoring Terminal]

The operation monitoring terminal 2 performs an operation and monitoring with respect to the plant. The operation monitoring terminal 2 may be an interface apparatus that performs an interface between a user and the plant. For example, the operation monitoring terminal 2 may control the process via the operation controller 13 in accordance with an operation by the user. In one example, the operation monitoring terminal 2 may receive a process value from the operation controller 13, and supply a target value of the process value to the operation controller 13. In addition, the operation monitoring terminal 2 may change a value of a setting parameter of the field device 11 via the operation controller 13. The operation monitoring terminal 2 may be, for example, an HMI terminal (in one example, a product of Yokogawa Electric Corporation "HIS" (Human Interface Station), and may be constituted of a personal computer (PC) or the like. The operation monitoring terminal 2 includes an input apparatus 20, a display apparatus 21, and a display controller 25.

The input apparatus 20 receives various input operations from the user, and outputs corresponding operation signals. According to the present embodiment, in one example, the input apparatus 20 may supply the operation signals to the display controller 25.

The display apparatus 21 displays various information in accordance with control signals from the display controller 25. For example, the display apparatus 21 may display a display area 210 (see FIG. 3) for alarms in the display screen. The display area 210 may be a region on an inner side with respect to a frame. In one example, the display area 210 may be a region that is provided within the frame where the alarm message or the like is displayed. The display area 210 may also be a window part of a paned window, that is, a pane surrounded by the frame. Herein, the frame may surround four sides to indicate a boundary. In a case where a plurality of frames exists in the display screen, the display area 210 may be an inner region of the innermost frame. Similarly, in a case where a plurality of frame borders exists in the display screen, the display area 210 may be an inner region of a frame formed by the innermost frame border. A part of the frame may be displayed in a bolder line than in other parts, and may also be used as a title bar.

[1-4-1. Display Controller]

The display controller 25 controls display contents of the display apparatus 21. According to the present embodiment, in one example, the display controller 25 may control display modes of alarms. The display controller 25 includes a storage unit 250, a display condition setting unit 251, an obtainment and extraction unit 252, a selection unit 254, a detection unit 255, and a display control unit 256.

The storage unit 250 stores each display attribute that may be set for the display area 210 (corresponding to the attribute of the alarms displayed in the display area 210), and an indicator image 211 (see FIG. 3 or the like) indicating the display attribute, while being associated with each other. The display attribute of the display area 210 may be the attribute of the alarms displayed in the display area 210.

Herein, the display attribute may specify contents of a part of the attributes included in the detail information (attribute) of the alarms. In one example, the display attribute may also specify the attribute of the type of the alarm as the system alarm, may also specify the attribute on whether or not the handing is shelved as the handing being shelved, and may also specify the attribute of the generation time as a specific time slot. The display attribute may be optionally defined by the user using the operation monitoring terminal 2 or the other device externally connected to the operation monitoring terminal 2, and stored in the storage unit 250.

The indicator image 211 may also be a symbol mark representing the attribute of the alarm, or a text indicating the contents of the attribute defined as a graphic. The indicator image 211 may also be stored in the storage unit 250 by default, or may also be created by the user and stored in the storage unit 250. The correspondence relationship between the display attribute and the indicator image 211 in the storage unit 250 may be optionally changed by the user.

The display condition setting unit 251 sets a display condition of the alarm. The display condition setting unit 251 may set the display condition in accordance with the operation signal from the input apparatus 20. The display condition setting unit 251 may include a position and size setting unit 2511 and an attribute setting unit 2512.

The position and size setting unit 2511 sets at least one of the number of the display areas 210, the display position, or the display size. The position and size setting unit 2511 may supply the setting contents with regard to the display area 210 to the display control unit 256.

The attribute setting unit 2512 sets the attribute of the alarms to be displayed, that is, the display attribute for each of the display areas 210. In a case where the position and size setting unit 2511 sets a plurality of display areas 210 in the display screen, the attribute setting unit 2512 sets the display attribute for each of the display areas 210. The attribute setting unit 2512 may set the display attribute by selecting the attribute in the storage unit 250. The attribute setting unit 2512 may supply the contents of the display attribute to the display control unit 256.

The obtainment and extraction unit 252 obtains the alarms generated in the plant, and extracts each alarm corresponding to the display attribute of the display area 210. The obtainment and extraction unit 252 may obtain alarms from the alarm management apparatus 14, and supply the extracted alarms to the display control unit 256. In a case where the position and size setting unit 2511 sets the plurality of display areas 210 in the display screen, for each of display areas 210, the obtainment and extraction unit 252 may extract each alarm corresponding to the display attribute of the display area 210 to be supplied to the display control unit 256. It is noted that according to the present embodiment, in one example, the description has been provided that the obtainment and extraction unit 252 obtains the alarms from the alarm management apparatus 14 via the network 101. However, in a case where the alarm management apparatus 14 is directly connected to the operation monitoring terminal 2 without the intermediation of the network 101, the alarms may be obtained directly from the alarm management apparatus 14 without the intermediation of the network 101.

The selection unit 254 selects the indicator image 211 corresponding to the display attribute set for the display area 210 from the plurality of indicator images 211 stored in the storage unit 250. The selection unit 254 may supply the selected indicator image 211 to the display control unit 256. In a case where the plurality of display areas 210 are set in the display screen by the position and size setting unit 2511, the selection unit 254 may select the indicator image 211 for each of the display areas 210 to be supplied to the display control unit 256. That is, the selection unit 254 may select the indicator image 211 corresponding to the display attribute of each of the plurality of display areas 210 to be supplied to the display control unit 256.

The detection unit 255 detects a communication failure on an alarm obtaining route. According to the present embodiment, in one example, since the alarms are output from the operation controller 13 and obtained by the display controller 25 via the network 101 and the alarm management apparatus 14, the communication failure on this obtaining route may be detected by the detection unit 255. In a case where the obtainment and extraction unit 252 directly obtains the alarms from the alarm management apparatus 14 without the intermediation of the network 101, the detection unit 255 may also detect the communication failure on a route between the alarm management apparatus 14 and the obtainment and extraction unit 252. In a case where the communication failure is detected, the detection unit 255 may supply a failure detection signal to the display control unit 256.

The display control unit 256 displays, in the display area 210, each alarm corresponding to the display attribute among the alarms generated in the plant, and also collectively displays, in the display area 210, the indicator image 211 corresponding to the display attribute. Display of the alarms may be display of characters and numbers indicating the contents of the alarms. In addition, collective display of the indicator image 211 corresponding to the display attribute may be display of the indicator image 211 altogether while being associated with a whole of each alarm without individually displaying the indicator image 211 with respect to each alarm, and in one example, may be display of the single indicator image 211 with respect to the whole of each alarm.

The display control unit 256 may display the alarms extracted by the obtainment and extraction unit 252 in the display area 210. In addition, the display control unit 256 may display the indicator image 211 selected by the selection unit 254 in the display area 210. In a case where the plurality of display areas 210 are set by the position and size setting unit 2511, the display control unit 256 may display, in each of the plurality of display areas 210, each alarm corresponding to the display attribute of the display area 210, and also collectively display, in each of the plurality of display areas 210, the indicator image 211 selected for the display area 210.

In accordance with the display controller 25 described above, each alarm corresponding to the display attribute is displayed in the display area 210, and the indicator image 211 corresponding to the display attribute is collectively displayed. Thus, unlike a case where the contents of the display attribute are displayed outside the display areas 210, it is not necessary to move the line of sight out of the display area 210 to check the display attribute. In addition, as compared with a case where the contents of the display attribute are displayed on the frame, it is possible to increase the display size of the attribute. Therefore, it can be facilitated to understand the attribute of the displayed alarms.

In addition, in each of the plurality of display areas 210, each alarm corresponding to the display attribute of the display area 210 is displayed, and the indicator image 211 corresponding to the display attribute is collectively displayed. Thus, it can be facilitated to understand the displayed attribute of the alarms with regard to each of the plurality of display areas 210.

In addition, since the display attribute is set with respect to each of the display areas 210, the displayed attribute of the alarms can be set as any attribute.

[2. Operation of Display Controller 25]

Figure 2:
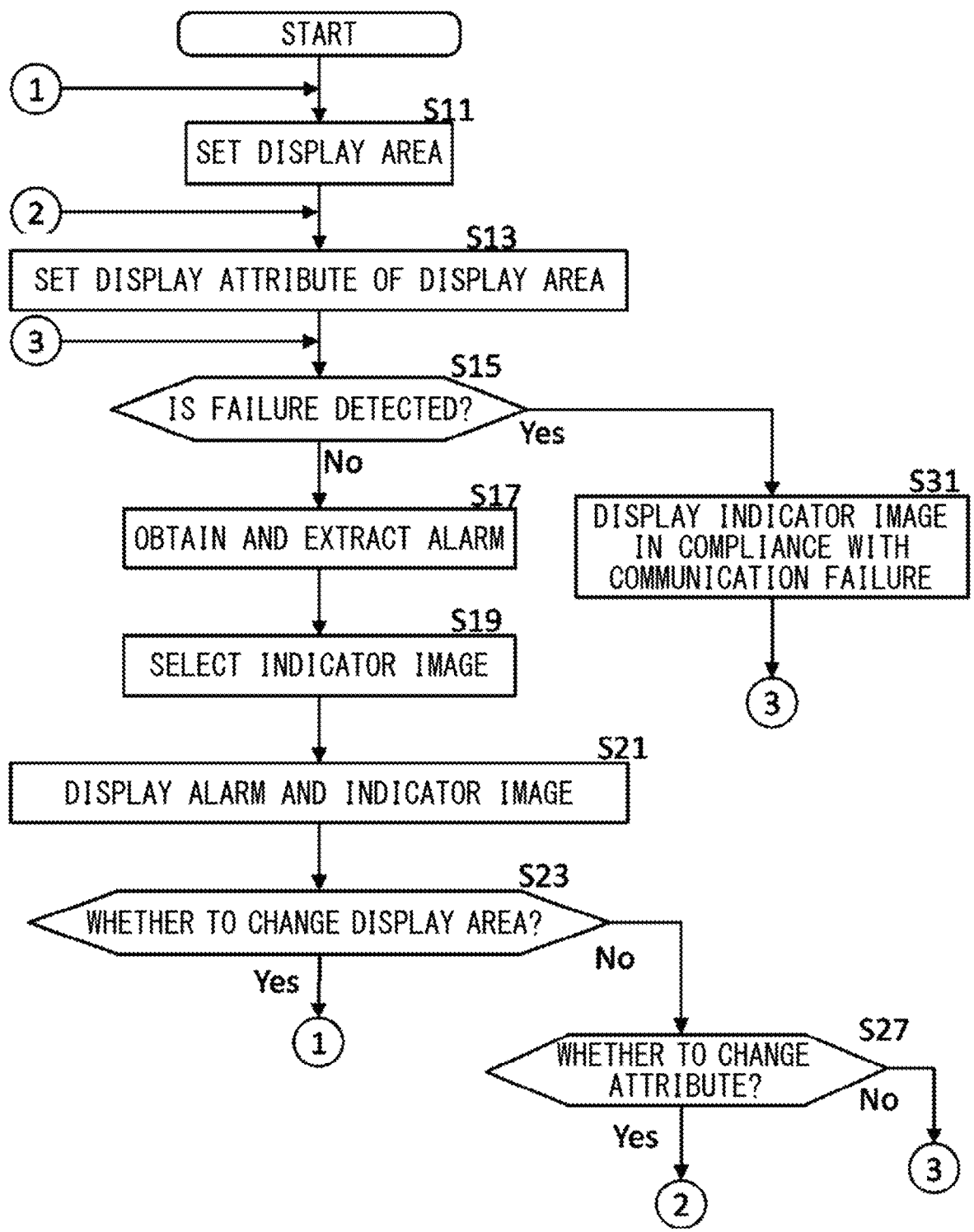
FIG. 2 shows an operation of a display controller 25.

FIG. 2 illustrates an operation of the display controller 25. The display controller 25 performs processing in steps S11 to S31 to cause the display apparatus 21 to display the alarms.

In step S11, the position and size setting unit 2511 of the display condition setting unit 251 sets a position and a size with regard to each of one or more of display areas 210 in the display screen. The position and size setting unit 2511 may also set the position and the size of each of the display areas 210 in accordance with the operation signal from the input apparatus 20, may also set the position and the size in accordance with default setting contents, or may also set the position and the size in accordance with setting contents stored at the time of the previous operation. In a case where the operation monitoring terminal 2 is used by a plurality of users, the position and size setting unit 2511 may also set the position and the size of each of the display areas 210 in accordance with the setting contents stored at the time of the previous operation by a logged-in account. It is noted that in a case where the plurality of display areas 210 are set in the display screen, the sizes may also vary among the display areas 210.

In step S13. the attribute setting unit 2512 of the display condition setting unit 251 sets a display attribute for each of the display areas 210. The attribute setting unit 2512 may also set the display attribute of each of the display areas 210 in accordance with the operation signal from the input apparatus 20, may also set the display attribute in accordance with the default setting contents, or may also set the display attribute in accordance with the setting contents stored at the time of the previous operation. In a case where the operation monitoring terminal 2 is used by the plurality of users, the attribute setting unit 2512 may also set the display attribute in accordance with the setting contents stored at the time of the previous operation by the logged-in account. In a case where the display attribute is set by the operation signal, a setting region of an attribute associated with each of the display areas 210 may be provided in the display screen of the display apparatus 21, and the display attribute may be set by the operation signal with respect to the setting region.

A plurality of display attributes may be set by the attribute setting unit 2512 for the single display area 210 displayed on the display screen, or for each of at least a part of the display areas 210 among the plurality of display areas 210 displayed on the display screen. In one example, the attribute setting unit 2512 may set two display attributes including an attribute indicating that the alarm is a system alarm and an attribute indicating that the alarm is generated in a particular section in the plant as the display attributes for the one display area 210.

In addition, the attribute setting unit 2512 may set a common display attribute for each of two or more of the display areas 210. In this case, the attribute setting unit 2512 may collectively set the common display attribute for these display areas 210 in accordance with an operation by the user (according to the present embodiment, in one example, in accordance with the operation signal from the input apparatus 20). In one example, the attribute setting unit 2512 may select whether to set the display attribute individually or set the display attribute collectively for two or more of the display areas 210 in accordance with an operation by the user. In a case where any one of the individual setting and the collective setting of the display attribute is more frequently used than the other setting, unless a switching operation is performed from the user, the attribute setting unit 2512 may also select the one setting method by default. In a case where the selection is made to set the display attribute collectively, the attribute setting unit 2512 may select the display area 210 set as the setting target in accordance with an operation by the user, or select all the display areas 210 in the display screen, and collectively set the common display attribute for each of the selected display areas 210.

It is noted that the display area 210 where the common display attribute is set may also be the same as, or may also be different from, the display area 210 where a plurality of display attributes are set. In one example, the display attribute common to all the display areas 210 displayed on the display screen and each unique display attribute may be set.

In step S15, the detection unit 255 determines whether or not a communication failure occurs on an alarm obtaining route. For example, the detection unit 255 may monitor a communication status on the alarm obtaining route from the operation controller 13 to the display controller 25 to determine the presence or absence of the communication failure. In one example, the detection unit 255 may periodically monitor whether or not the communication is performed between devices in the plant, and determine the communication failure in a case where the communication is not performed.

It is noted that in a case where the communication failure has occurred, an alarm thereof may be generated by the operation controller 13. For example, the operation controller 13 may sequentially update a list of live signals generated by each of the devices (in one example, the field devices 11) connected to the control network 100, that is, the list indicating a vital status of each of the devices. In a case where the device that has not performed the communication which is so-called dead device exists in the list, the operation controller 13 may generate an alarm indicating that effect to be transmitted to the alarm management apparatus 14.

In a case where the communication failure is detected (step S15; Yes), the display controller 25 may proceed to the processing in step S31. In a case where the communication failure is not detected (step S15; No), the display controller 25 may proceed to the processing in step S17.

In step S17, the obtainment and extraction unit 252 obtains alarms generated in the plant from the alarm management apparatus 14, and extracts the alarms corresponding to the display attribute of each of the display area 210. In a case where the display area 210 in which the plurality of display attributes are set exists, with regard to the display area 210 of those display attributes, the obtainment and extraction unit 252 extracts each alarm corresponding to all of the plurality of display attributes of the display area 210. In one example, in a case where two display attributes including the attribute indicating that the alarm is the system alarm and the attribute indicating that the alarm is generated in the particular section are set as the display attributes for the one display area 210, the obtainment and extraction unit 252 extracts each alarm that is the system alarm and is also generated in the particular section with respect to the display area 210.

In step S19, the selection unit 254 selects the indicator image 211 corresponding to the display attribute from the plurality of indicator images 211 stored in the storage unit 250 for each of the display areas 210. In a case where the display area 210 in which the plurality of display attributes are set exists, for the display area 210, the selection unit 254 selects each of the indicator images 211 corresponding to the plurality of display attributes set for the display area 210.

In step S21, the display control unit 256 displays, in each of display areas 210, each of the alarms corresponding to the display attributes of the display area 210, and also collectively displays the indicator images 211 corresponding to the display attributes.

The display control unit 256 may display, in each of the display areas 210, only the alarm corresponding to the display attribute of the display area 210 among the plurality of alarms generated in the plant. In this case, since the alarms can be narrowed down by the attribute and displayed, it is possible to understand the alarm of the desired attribute easily. Instead of this, the display control unit 256 may display, in each of the display areas 210, the plurality of alarms generated in the plant also including an alarm corresponding to a display attribute other than that of the display area 210, and perform identification display of the alarms corresponding to the display attribute of the display area 210. In this case, the relationship between the alarms corresponding to the display attribute and the other alarms can be easily understood. It is noted that the identification display may be performed by changing at least one of a size of a character, the presence or absence of an underline, the presence or absence of an emphasis point, the presence or absence of a shading, a font color, or the like.

In a case where the display area 210 in which the plurality of display attributes are set exists, the display control unit 256 displays, in the display area 210, each alarm corresponding to all of the plurality of display attributes of the display area 210, and also collectively displays each of the indicator images 211 corresponding to the display attributes. For example, two display attributes are set for the display area 210, the display control unit 256 collectively displays, in the display area 210, the indicator image 211 corresponding to one of the display attributes, and collectively displays the indicator image 211 corresponding to the other display attribute. In one example, the display control unit 256 may display the plurality of indicator images 211 side by side in the single display area 210. In a case where the identification display of the alarms corresponding to all of the two display attributes is performed, the identification display of the alarms may be performed in separate modes in accordance with each setting information while the display control unit 256 displays the alarm corresponding to the one display attribute in the display area 210 in boldface, and displays the alarm corresponding to the other display attribute with an underline, for example.

In a case where the common display attribute is set for two or more of the display areas 210 and unique display attributes, that is, different display attributes between the display areas 210 are further set, the display control unit 256 may collectively display, in each of these display areas 210, the indicator image 211 corresponding to at least the unique display attribute among the display attributes of the display area 210. The display control unit 256 may display the common display attribute too in each of these display areas 210.

The display control unit 256 may display the selected indicator image 211 as a watermark image. The watermark image may be a visible watermark, and may be displayed by being overlapped with the alarm. It is noted that in a case where the alarm in the display area 210 is scrolled, the indicator image 211 may be displayed in the same position without tracking the alarm.

It is noted that in a state where the alarm is displayed in the display area 210, one or more of the detail information of the alarm may be modified in response to user operations with respect to the operation monitoring terminal 2. For example, the operation monitoring terminal 2 may modify one of the detail information of the alarm into contents indicating that the alarm is shelved, the display is suppressed, or the alarm has been already handled.

In step S23, the position and size setting unit 2511 of the display condition setting unit 251 determines whether or not an operation signal is input for instructing at least one of changes of the number of the display areas 210, the position, or the size. In a case where it is determined that the operation signal is input (step S23; Yes), the position and size setting unit 2511 proceeds to the processing in step S11 described above. In a case where it is determined that the operation signal is not input (step S23; No), the position and size setting unit 2511 proceeds to the processing in step S27.

It is noted that in a case where the operation signal for changing the display area 210 is input to perform the processing in step S11, the position and size setting unit 2511 changes at least one of the number of the display areas 210, the position, or the size in accordance with the operation signal.

In one example, in step S11, the position and size setting unit 2511 may increase or decrease the number of the display areas 210 in the display screen. In this case, when the number of the display areas 210 is decreased in the following step S13, the attribute setting unit 2512 does not need to perform attribute setting. In a case where the number of the display areas 210 is increased, the attribute setting unit 2512 may set at least one display attribute for the increased display area 210.

In addition, in step S11, the position and size setting unit 2511 may change a size of the display area 210. In this case, in the subsequent step S21, the display control unit 256 may change at least one of the size or the position of the indicator image to be matched with the size of the display area 210. In one example, in a case where the indicator image does not fit in the display area 210 after the display area 210 is reduced, the display control unit 256 may reduce and display the indicator image.

In step S27, the attribute setting unit 2512 of the display condition setting unit 251 determines whether or not the operation signal is input for instructing the change of the display attribute any of the display areas 210. For example, the attribute setting unit 2512 may determine that the operation signal is input for instructing the change of the display attribute in accordance with a specific operation signal with respect to the display area 210 or the setting region of the display attribute. In addition, the attribute setting unit 2512 may determine that the change of the display attribute is instructed in accordance with a selection of an icon or the like relevant to the display attribute, an input of the display attribute to an input field (not shown), or the like. In a case where it is determined that the operation signal is not input (step S27; No), the attribute setting unit 2512 proceeds to the processing in step S15. In a case where it is determined that the operation signal is input (step S27; Yes), the attribute setting unit 2512 proceeds to the processing in step S13.

It is noted that in a case where the operation signal for changing the display attribute is input to perform the processing in step S13, the attribute setting unit 2512 changes the display attribute of any of the display areas 210 in accordance with the operation signal. In one example, the attribute setting unit 2512 may also delete or change the display attribute already set for any one of the display areas 210, and may also add a new display attribute.

Then, in step S31 after the communication failure is detected (step S15; Yes), the display control unit 256 displays the indicator image 211 corresponding to the communication failure in the display area 210, and proceeds to the processing in step S15 (or step S11) described above. In a case where the plurality of display areas 210 are set in the display screen, the display control unit 256 may display the indicator image 211 of the communication failure in each of the display areas 210. The display control unit 256 may also continue displaying, in the display area 210, the alarm obtained and extracted when the processing in step S17 is performed in the previous time. In this case, the display control unit 256 may display the displayed alarm in a lighter color than a color at the time of a normal operation where the communication failure does not occur. That is, the display control unit 256 may also indicate a state where the communication in the system is cut off and the change is not reflected even when the operation instruction is performed, while the alarm information is displayed, but the characters and the like are displayed in a pale manner (in a lighter color).

In accordance with the above-described operations, since the indicator image 211 is displayed as the watermark image, the alarm and the indicator image 211 can be displayed while being overlapped with each other. Therefore, without narrowing the region that can be used for the alarm display in the display area 210, it is possible to understand the attribute of the displayed alarm easily.

In addition, in the display area 210 corresponding to at least a part of one or more display areas 210 displayed in the display screen, each alarm corresponding to all of the plurality of display attributes is displayed, and therefore the alarms to be displayed can be narrowed down as compared with a case where only one display attribute is set. Therefore, it is possible to detect the alarm of the desired attribute easily.

In addition, in the display area 210 for which the plurality of display attributes are set, since the plurality of indicator images 211 corresponding to the display attributes of the display area 210 are displayed, even in a case where the displayed alarms are narrowed down, it is possible to understand the attribute of the displayed alarm easily without narrowing the region that can be used for the alarm display in the display area 210.

In addition, in a case where the common display attribute is set for each of two or more of the display areas 210, after the alarms to be displayed are uniformly narrowed down using the common display attribute, it is possible to further narrow down the alarms using the unique display attribute.

In addition, since in each of the display areas 210 for which the common display attribute is set, the indicator image 211 corresponding to the unique display attribute among the display attributes of the display area 210 is displayed, even in a case where the plurality of display attributes are set, commonality and disparity of the display attributes can be clarified between the plurality of display areas 210.

In addition, since the common display attribute is collectively set for each of two or more of the display areas 210, the setting can be facilitated as compared with a case where the common display attribute is individually set for each of the display areas 210.

In addition, the attribute setting can be facilitated since a selection is made on whether to set the display attribute individually for two or more of the display areas 210 or to set the display attribute collectively for two or more of the display areas 210.

In addition, in a case where the communication failure is detected, since the indicator image 211 corresponding to the communication failure is displayed in the display area 210, unlike a case where the communication failure is announced outside the display area 210 in the display screen or a case where the communication failure is not announced in the display screen, it is possible to understand the occurrence of the communication failure clearly and also intuitively (immediately).

It is noted that the descriptions have been provided while the display control unit 256 displays the common display attribute in each of the display areas 210 in step S21 described above, but the display control unit 256 may also display the common display attribute in a region different from the display area 210. In this case, the display control unit 256 may also display the common display attribute as the indicator image 211 or may also display the common display attribute as a text indicating the contents of the display attribute. The display control unit 256 may display the display area 210 for which the common display attribute is set and the common display attribute while being associated with each other. In one example, the display control unit 256 may display, using the same color, frames that define these display areas 210 and frames that define the display area of the indicator image 211 corresponding to the common display attribute, the text indicating the contents of the attribute, or those (the indicator image 211 and the text). The display control unit 256 may also display, in a region different from the display area 210, a common attribute window W1 (see FIG. 10) indicating the common display attribute for all the display areas 210. As described above, in a case where the common display attribute is displayed in the region different from the display area 210, visibility can be improved by decreasing the number of the indicator images displayed in the display area 210. It is noted that the display control unit 256 may further display a correspondence map between the display position (arrangement) of each of the display areas 210 on the screen and the unique display attribute, that is, a unique attribute window W2 (see FIG. 10) indicating a map that represents which display attribute corresponds to the display area 210 in which position.

[3. Display Example]

Figure 3:
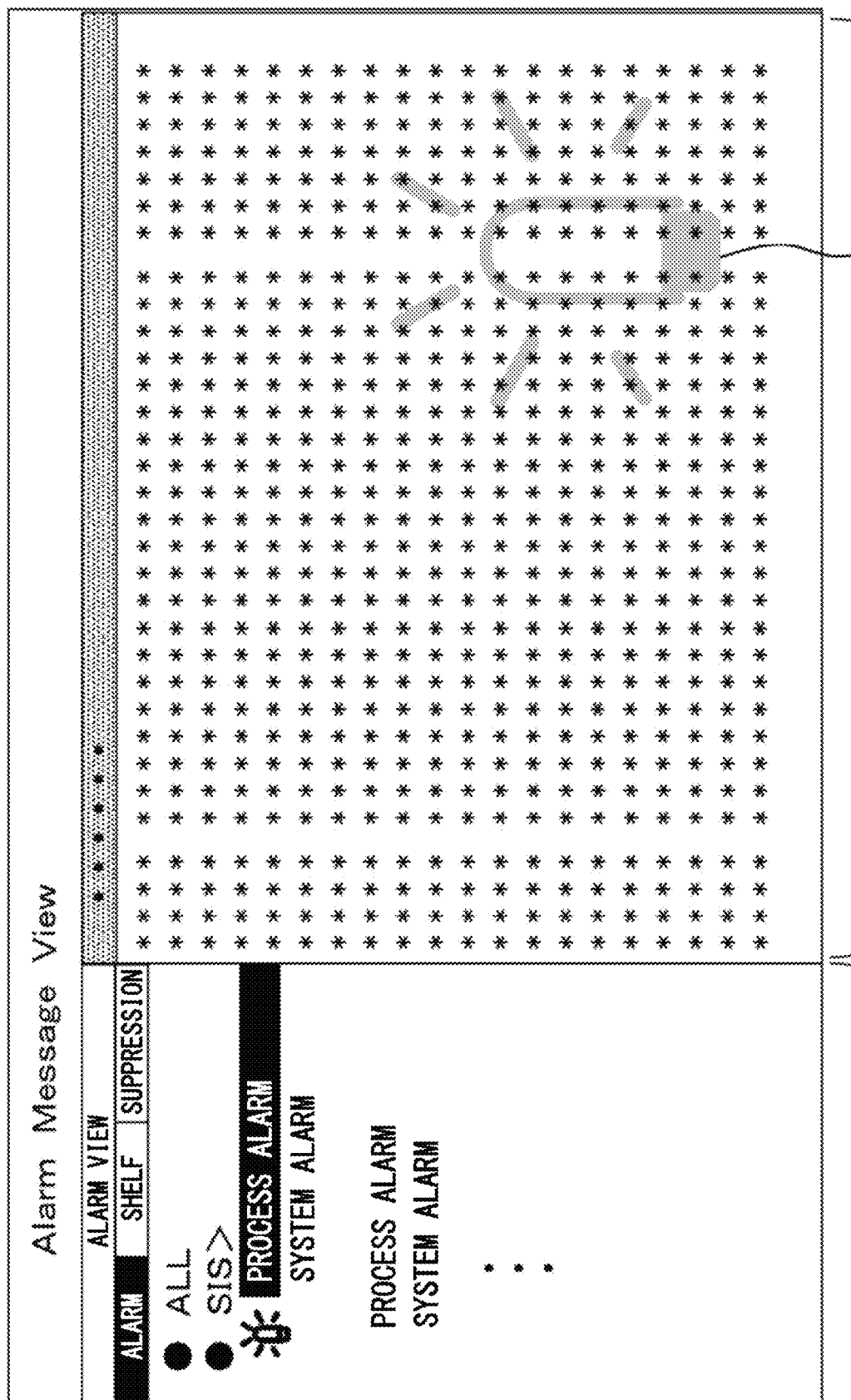
FIG. 3 shows a display screen in a case where a display attribute of a display area 210 is set.

FIG. 3 illustrates a display screen in a case where the display attribute of the display area 210 is set. In this drawing, in one example, a setting area 215 for setting the display attribute is provided on a left side of the display screen, and the display area 210 for the alarm is provided on a right side of the display screen.

A plurality of tabs T for narrowing down the display attributes is displayed in the setting area 215. According to the present embodiment, in one example, to narrow down the display attributes, the tab T of the "alarm" for displaying the whole of the display attributes, the tab T of the "shelf" for displaying the display attribute of the shelved alarms, and the tab T of the "suppression" for displaying the display attribute of the alarms the display of which is suppressed are displayed. In addition, in a state where the tab T of the "alarm" is selected, the entire display attributes are hierarchized and displayed, and according to the present embodiment, in one example, the display attribute indicating the process alarm among alarms with regard to "SIS" (safety system) is selected. Then, the alarm corresponding to this display attribute is displayed in the display area 210, and the indicator image 211 corresponding to the display attribute is displayed. It is noted that, for simplification, characters and numerals indicating the alarm contents are denoted by "*" in this drawing, FIGS. 4 to 10 described below, and the like. After the display attribute is selected, the setting area 215 may be reduced and displayed.

Figure 4:
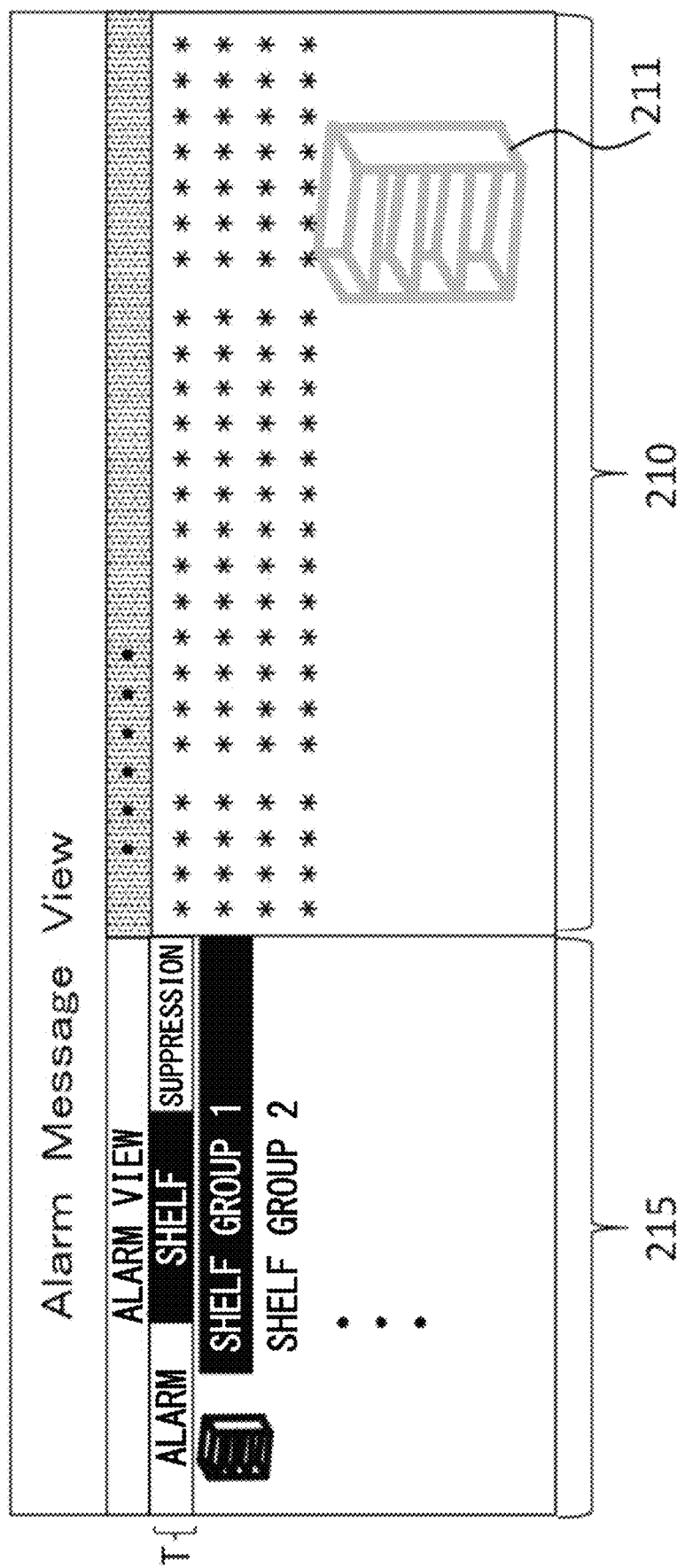
FIG. 4 shows another display screen in a case where the display attribute of the display area 210 is set.

FIG. 4 shows another display screen in a case where the display attribute of the display area 210 is set. In this drawing, in one example, the tab T of the "shelf" is selected in the setting area 215, and the display attribute classified as a "shelf group 1" among the shelved alarms is selected. In addition, the alarm corresponding to this display attribute is displayed in the display area 210, and the indicator image 211 corresponding to the display attribute is displayed. In the case of the example of the drawing, the indicator image 211 of a shelf (shelving) common to each shelf group is displayed. It is noted that as the indicator images 211 for the "shelf group 1" and a "shelf group 2", instead of the display of the indicator image 211 of the shelf common to each shelf group, the indicator images 211 unique to the "shelf group 1" and the "shelf group 2" may also be displayed.

Figure 5:
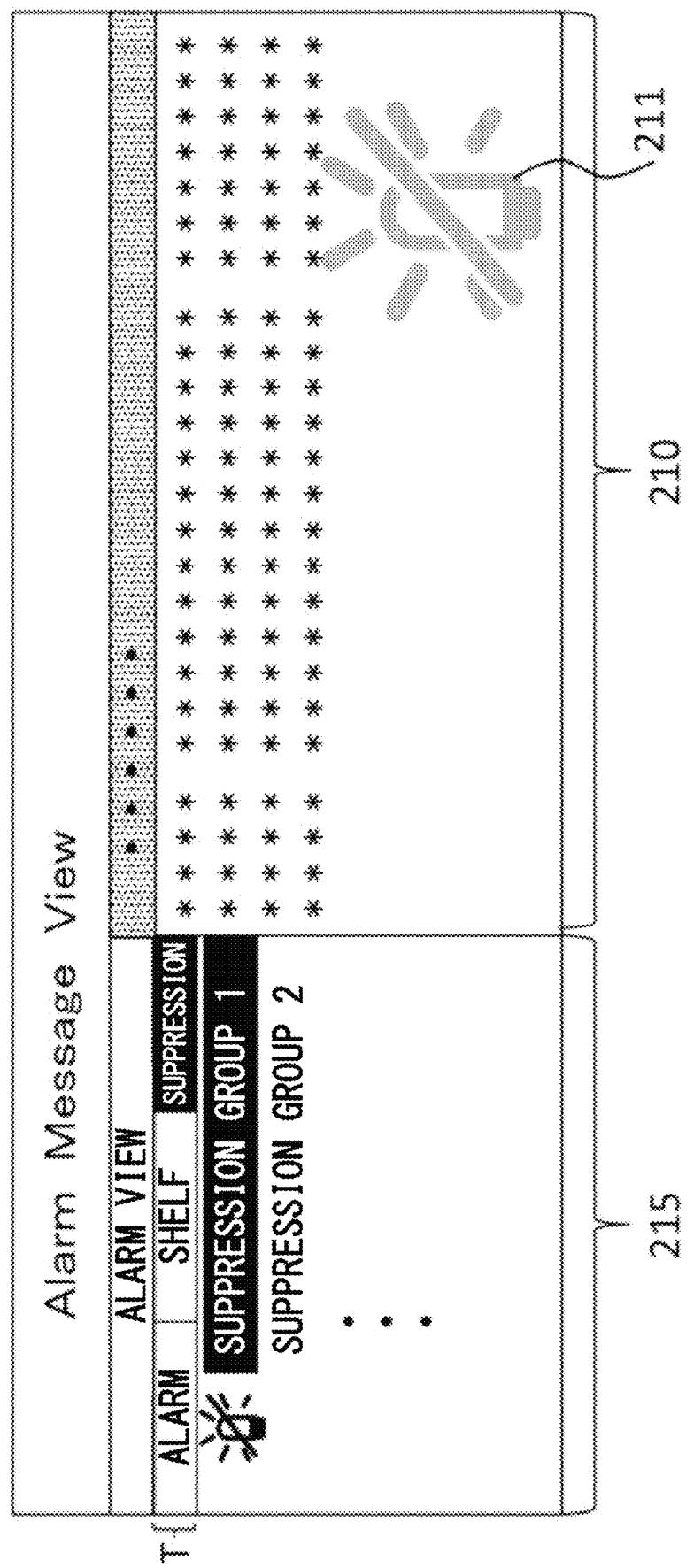
FIG. 5 shows another display screen in a case where the display attribute of the display area 210 is set.

FIG. 5 shows another display screen in a case where the display attribute of the display area 210 is set. In this drawing, in one example, the tab T of the "suppression" is selected in the setting area 215, and the display attribute classified as a "suppression group 1" is selected among the alarms the display of which is suppressed. In addition, the alarm corresponding to this display attribute is displayed in the display area 210, and the indicator image 211 corresponding to the display attribute (in one example, the indicator image 211 common to each suppression group) is displayed.

Figure 6:
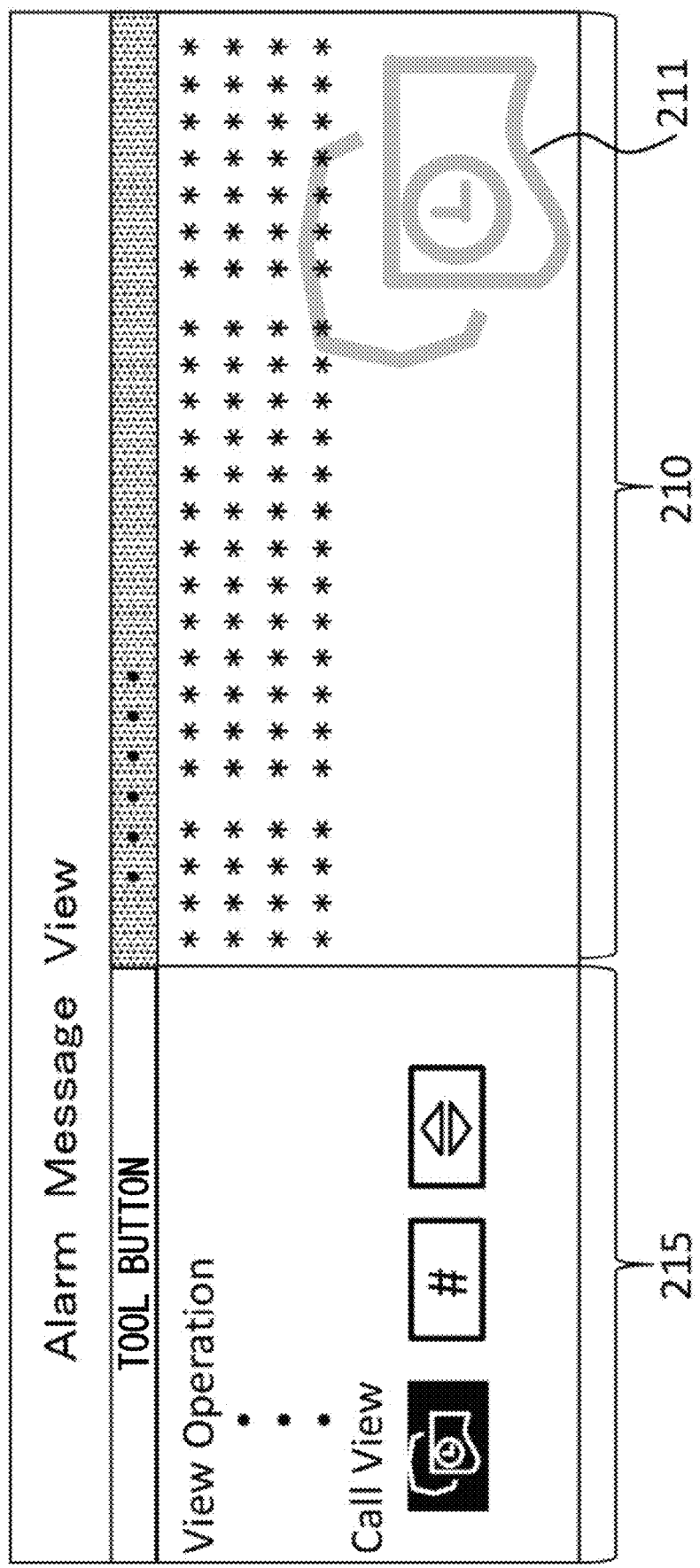
FIG. 6 shows another display screen in a case where the display attribute of the display area 210 is set.

FIG. 6 shows another display screen in a case where the display attribute of the display area 210 is set. In this drawing, in one example, a list of tool buttons is displayed in the setting area 215, and the display attribute indicating the already handled past alarm (historical data) is selected. In addition, the alarm corresponding to this display attribute is displayed in the display area 210, and the indicator image 211 corresponding to the display attribute is displayed.

Figure 7:
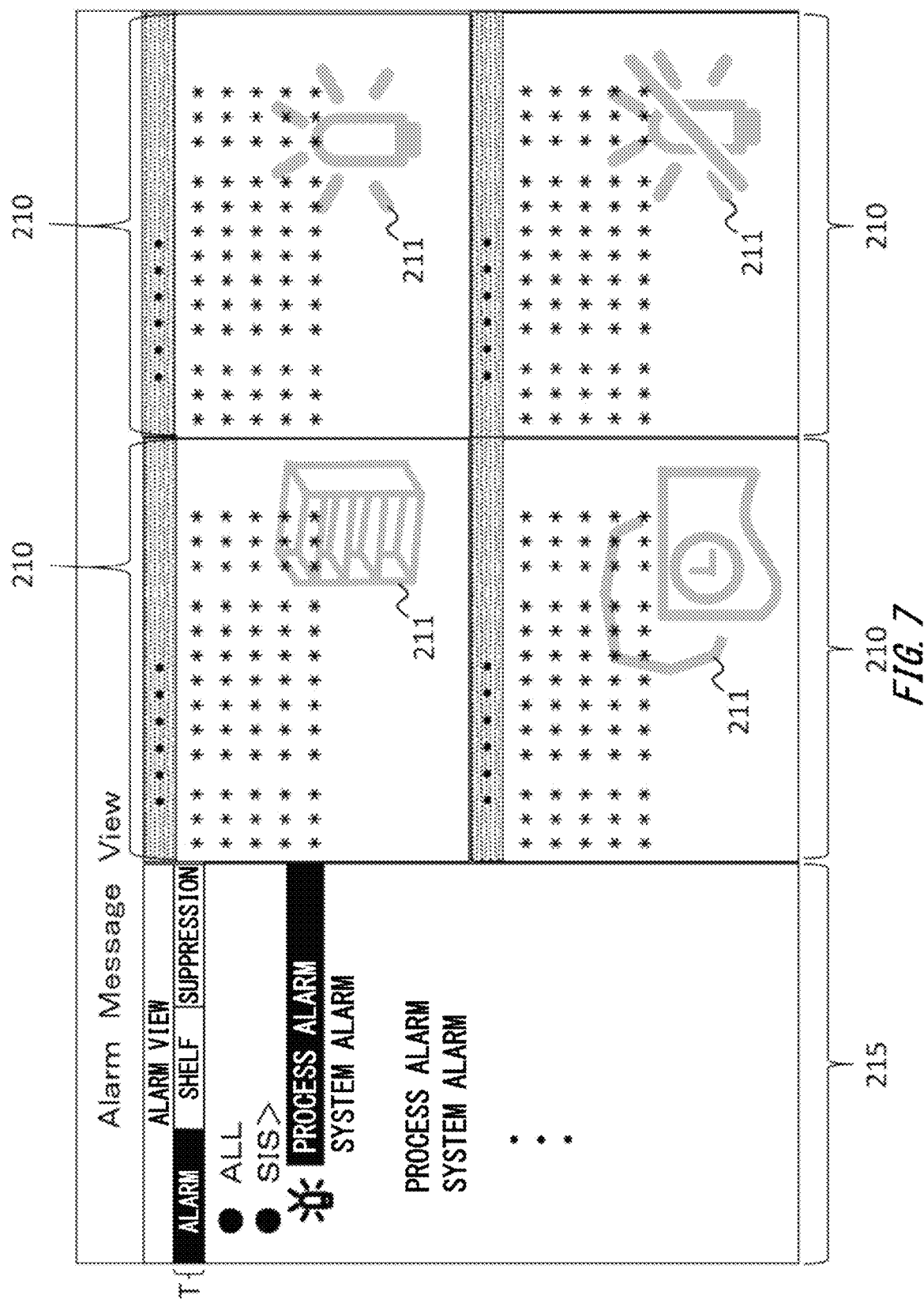
FIG. 7 shows another display screen in a case where the display attribute of the display area 210 is set.

FIG. 7 shows another display screen in a case where the display attribute of the display area 210 is set. In this drawing, in one example, the four display areas 210 are provided in the display screen, and the alarm and the indicator image 211 corresponding to the display attribute are displayed in each of the display areas 210.

Figure 8:
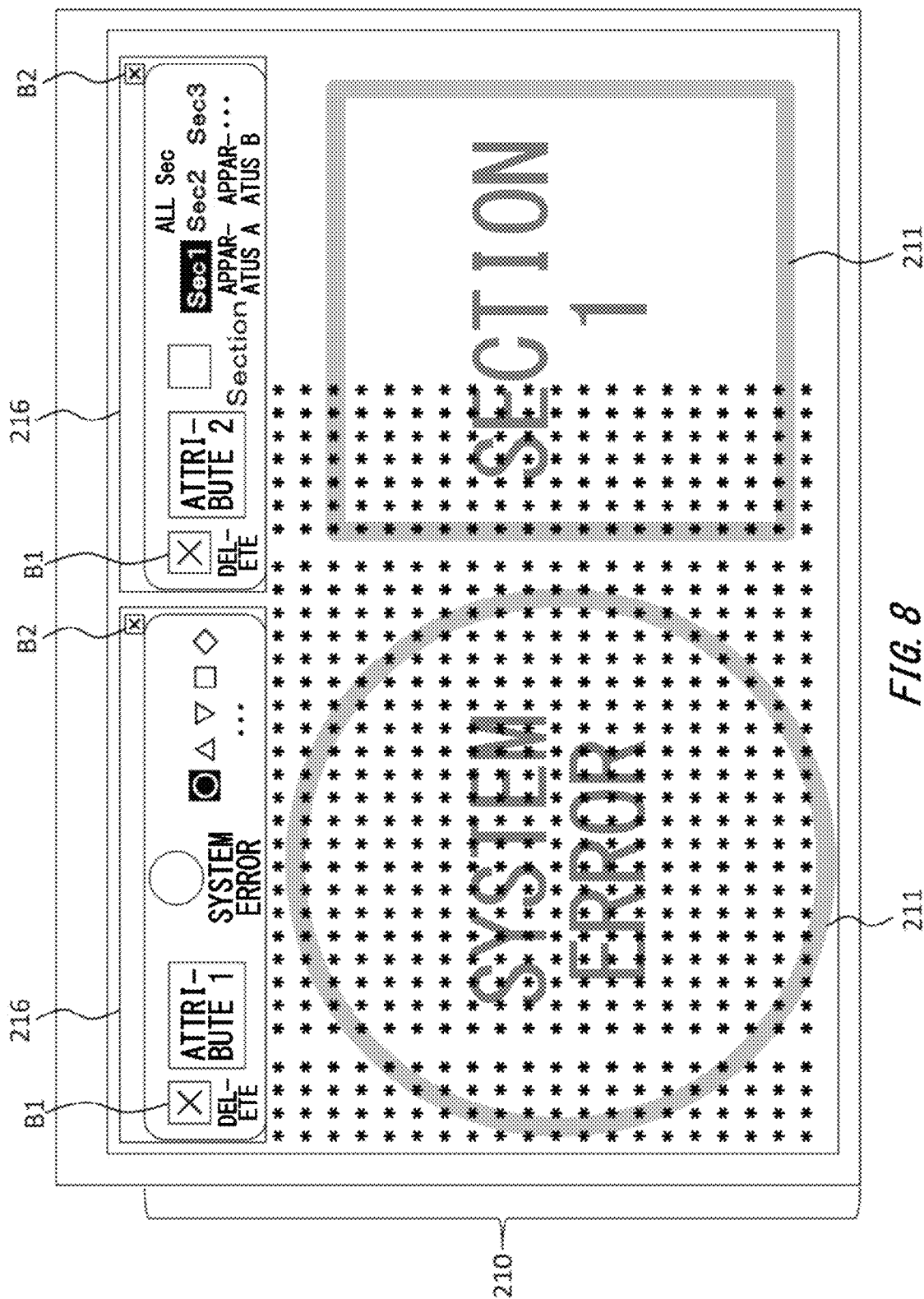
FIG. 8 shows another display screen in a case where the display attribute of the display area 210 is set.

FIG. 8 shows another display screen in a case where the display attribute of the display area 210 is set. In this drawing, in one example, the single display area 210 is provided in the display screen, and two setting areas 216 for setting the display attributes are provided on the upper side in the display area 210. Among those, in the setting area 216 on the left side in the drawing, when a symbol mark of the system error (in this drawing, a circle mark) is selected from symbol marks of each of the attributes, the display attribute indicating the system error is set. In addition, in the setting area 216 on the right side in the drawing, a symbol mark of the generation section (where the alarm is generated) (in this drawing, a rectangle mark) is selected. Furthermore, selectable attributes are hierarchized and displayed, and the attribute indicating that the generation section is the "section 1" is selected. In the display area 210, the alarms corresponding to all of these display attributes are displayed, and each of indicator images 211 corresponding to these display attributes is displayed. It is noted that in each of the setting areas 216, a delete button B1 for deleting (cancelling) the display attribute and a close button B2 for closing (cancelling display) the setting area 216 may be displayed. After the display attribute is selected, a configuration may be also adopted where the setting area 216 is not displayed.

Figure 9:
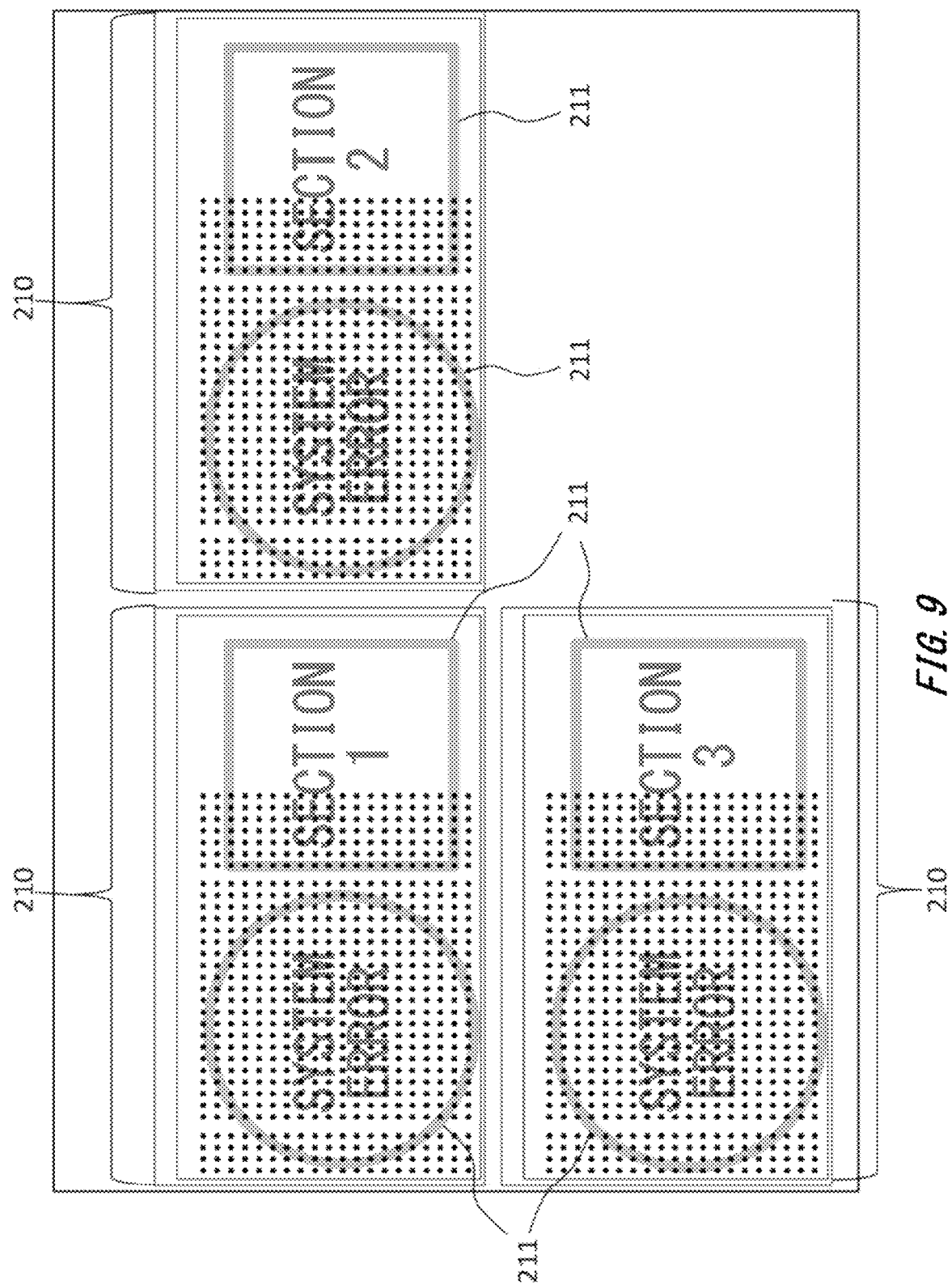
FIG. 9 shows another display screen in a case where the display attribute of the display area 210 is set.

FIG. 9 shows another display screen in a case where the display attribute of the display area 210 is set. In this drawing, in one example, the three display area 210 are provided in the display screen. The attribute indicating the system error is set for these display areas 210 as the common display attribute, and the attributes indicating that the generation sections (of the alarm with regard to the system error) are the "section 1" to the "section 3" are set as the unique display attributes. Then, the alarms corresponding to all of these display attributes are displayed in each of the display areas 210, and each of indicator images 211 corresponding to these display attributes is displayed.

Figure 10:
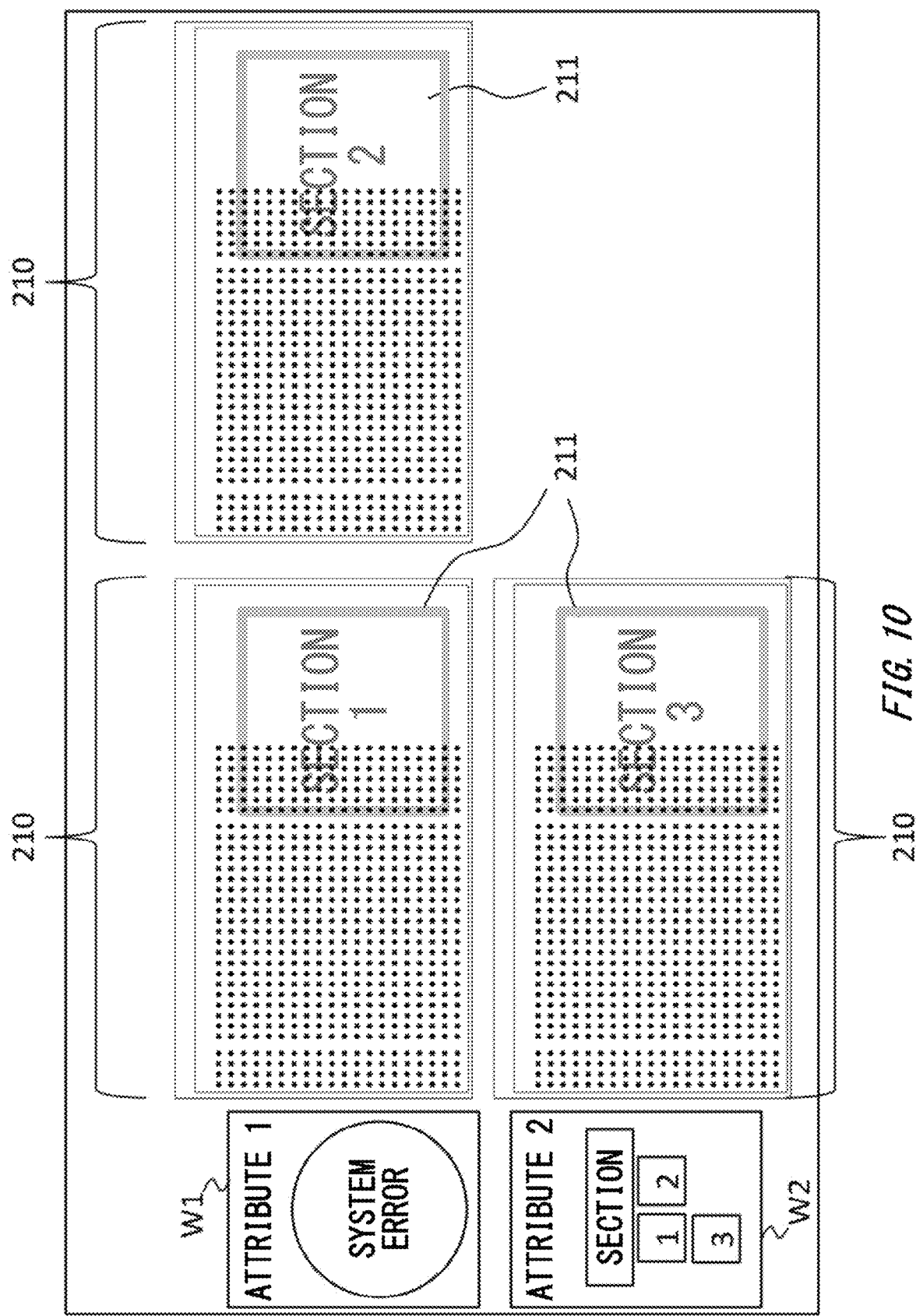
FIG. 10 shows another display screen in a case where a setting attribute of the display area 210 is set.

FIG. 10 shows another display screen in a case where the display attribute of the display area 210 is set. In this drawing, unlike FIG. 9, each of the indicator images 211 corresponding to the unique display attributes indicating the "section 1" to the "section 3" is displayed in each of the display areas 210. In addition, the common attribute window W1 indicating the common setting attribute indicating the system error, and the unique attribute window W2 indicating the unique display attributes indicating that the generation sections are the "section 1" to the "section 3" and a correspondence map of relevant positions in the display area 210 on the screen are provided outside the display area 210 in the display screen.

It is noted that in accordance with the unique attribute window W2, since the contents of the unique display attributes can be checked using the map, the indicator images 211 corresponding to the unique display attributes may also be simplified. In one example, the indicator image 211 corresponding to the attribute indicating that the generation section is the "section 1" may also indicate only "1" in the rectangular mark.

In addition, the common attribute window W1 and the unique attribute window W2 may also be used in a case where the display attribute is changed. For example, the display attribute of the corresponding display area 210 may be set when the user designates the display attribute for any of the display areas 210 in the common attribute window W1 or the unique attribute window W2. In one example, when the display attribute is changed in the common attribute window W1, the common display attribute may be collectively changed. In addition, by changing the display attribute in the unique attribute window W2, the unique display attribute of the relevant display area 210 may be individually changed.

Herein, in a case where the operation for adding the display area 210 is performed from a state where only the single display area 210 is displayed, the unique attribute window W2 may be displayed outside the display area 210, and the unique display attribute of the relevant display area 210 may be set when the user designates the display attribute in the unique attribute window W2. In addition, in a case where the display area 210 is added, the display attribute of the formerly existing display area 210 (in one example, the attribute indicating the system error) may be set for the added display area 210 as the common display attribute, and the common attribute window W1 may be displayed in the region different from the display area 210.

Figure 11:
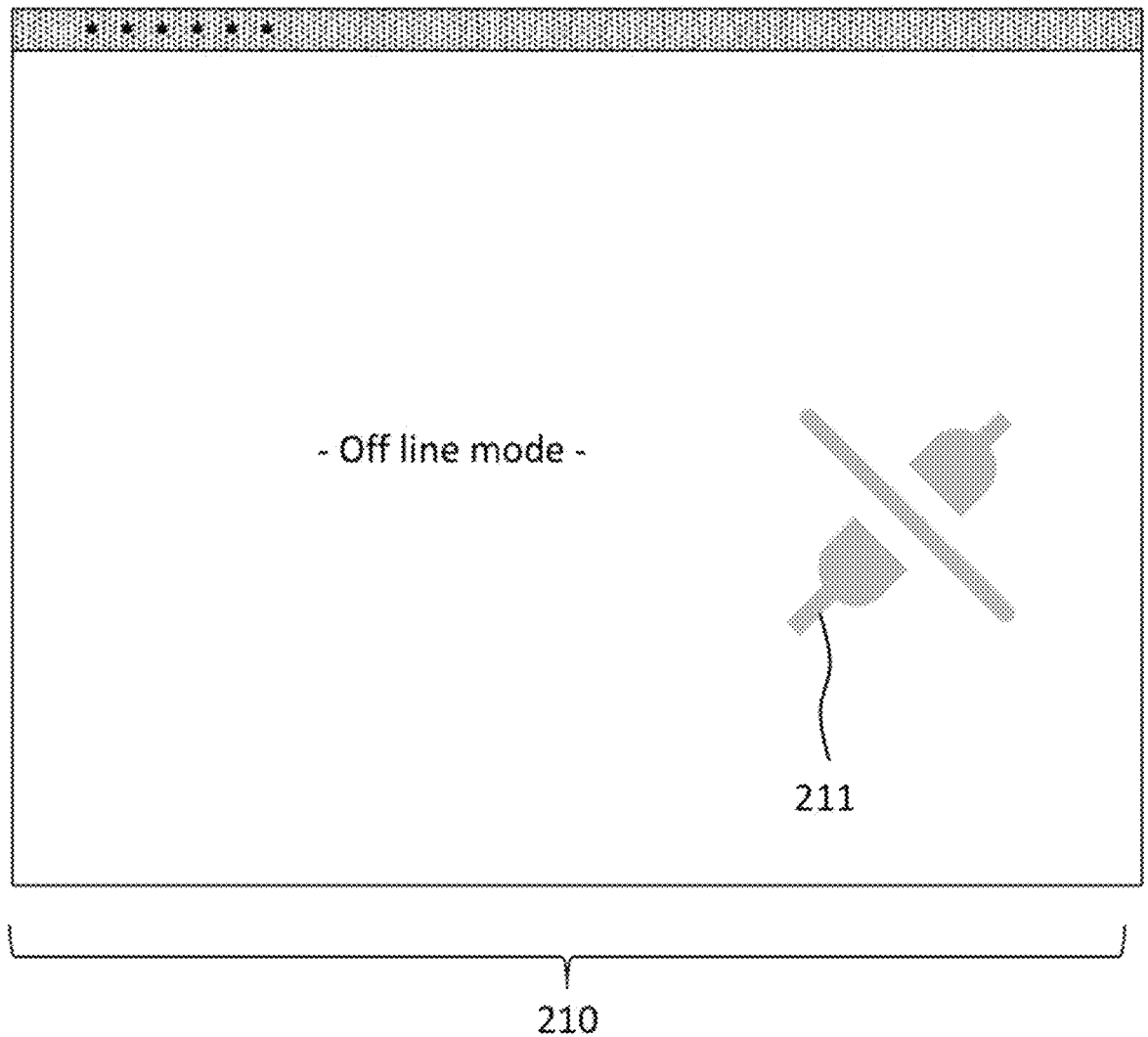
FIG. 11 shows the display area 210 in a case where a communication failure is detected.

FIG. 11 illustrates the display area 210 in a case where the communication failure is detected. In this drawing, the alarm is not displayed in the display area 210, and the indicator image 211 corresponding to the communication failure is displayed.

[4. Modified Example]

It is noted that the descriptions have been provided that the display controller 25 includes the storage unit 250, the display condition setting unit 251, the obtainment and extraction unit 252, and the detection unit 255 according to the above-described embodiment, but a configuration may also be adopted where at least one of these is not included. For example, a configuration may also be adopted where the display controller 25 does not include the storage unit 250, and the storage unit 250 may be provided as an external memory that is separate from the display controller 25 and connected to the display controller 25. In addition, a configuration may also be adopted where the display controller 25 does not include the display condition setting unit 251, and the display may also be performed by only the default display condition. In addition, a configuration may also be adopted where the display controller 25 does not include the obtainment and extraction unit 252. In this case, the alarm management apparatus 14 may include the obtainment and extraction unit 252, and when the display attribute of each of the display areas 210 is supplied to the alarm management apparatus 14, the display controller 25 may also obtain the alarm extracted in accordance with the relevant display attribute from the alarm management apparatus 14.

In addition, the descriptions have been provided while the alarm is output from the operation controller 13, but the alarm may also be output from the field device 11. In a case where the alarm is output from the field device 11, the obtainment and extraction unit 252 may also obtain the alarm from the field device 11. In addition, the descriptions have been provided while the obtainment and extraction unit 252 obtains the alarm generated in the plant from the alarm management apparatus 14, but the alarm may also be obtained from the operation controller 13. In these cases, the alarm management apparatus 14 may also be built in the operation monitoring terminal 2. The detection unit 255 may detect the communication failure on the alarm obtaining route by the obtainment and extraction unit 252. In addition, the detection unit 255 may detect the communication failure with the operation controller 13.

In addition, the display controller 25 has been described as apparatus separate from the input apparatus 20, the display apparatus 21, the operation controller 13, and the alarm management apparatus 14, but may also be an apparatus integrated with at least a part of these. In one example, the display controller 25 may be built in the alarm management apparatus 14, and cause the display apparatus 21 to display the processing result.

In addition, the descriptions have been provided while the indicator image 211 is displayed as the watermark image while being overlapped with the alarm, but a configuration may also be adopted where the indicator image 211 is not set as the watermark image, and the indicator image 211 is displayed in the display area 210 without being overlapped with the alarm.

Also, various embodiments of the present invention may be described with reference to flowcharts and block diagrams. Blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disk read-only memory (CD-ROM), a digital versatile disk (DVD), a BLU-RAY (registered trademark) disk, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), a wide area network (WAN) such as the Internet, and the like. Thereby, the processor of a general purpose computer, special purpose computer, or other programmable data processing apparatus or the programmable circuitry can execute the computer-readable instructions so as to create means for performing operations specified in the flowcharts or block diagrams. Examples of the processor include a computer processor, a processing unit, a microprocessor, a digital signal processor, a controller, a microcontroller, and the like.

Figure 12:
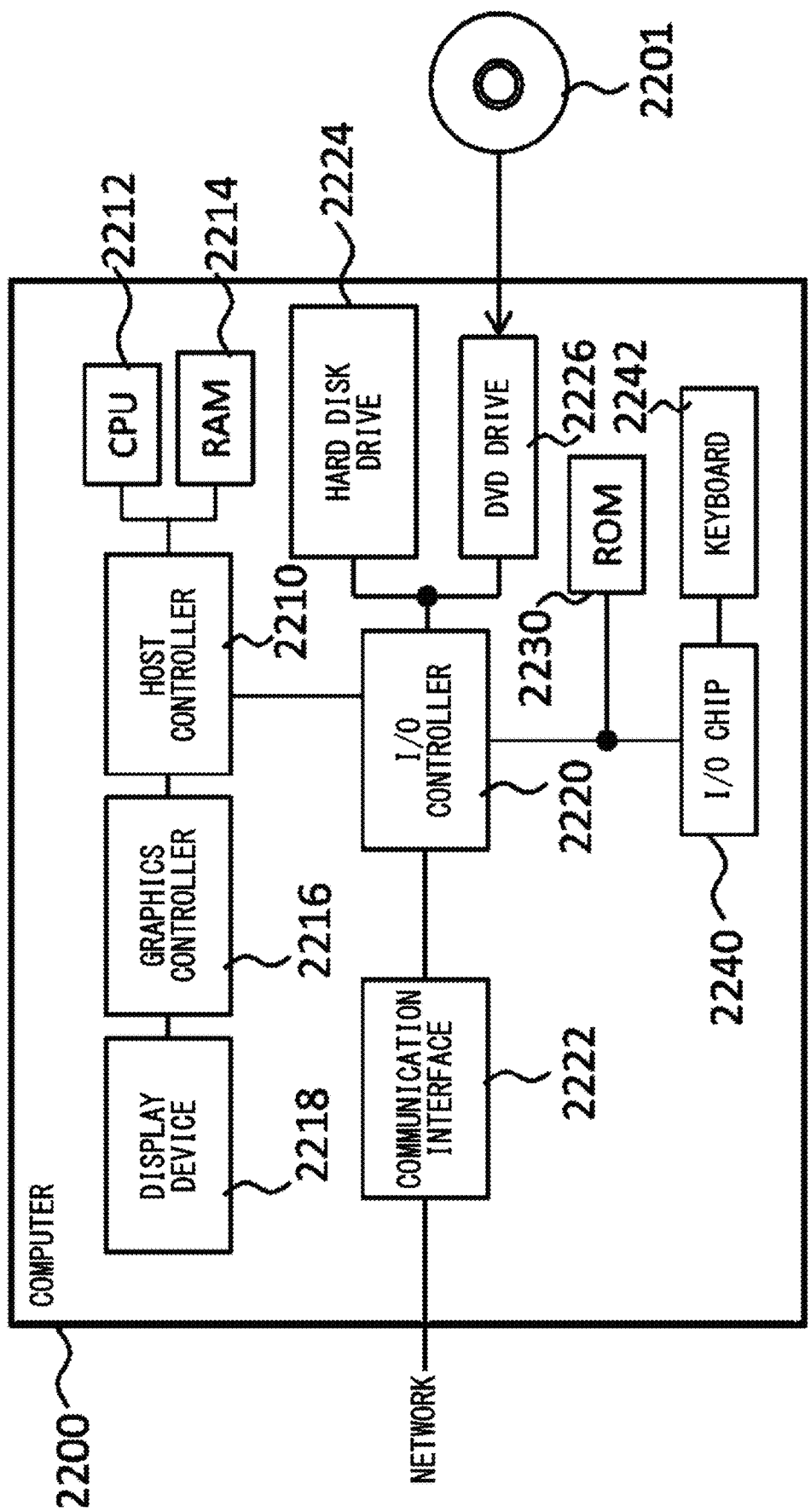
FIG. 12 shows an example of a computer 2200 in which a plurality of aspects of the present invention may be wholly or partially embodied.

FIG. 12 shows an example of a computer 2200 in which a plurality of aspects of the present invention may be wholly or partially embodied. A program that is installed in the computer 2200 can cause the computer 2200 to function as or perform operations associated with apparatus of the embodiments of the present invention or one or more sections thereof, and/or cause the computer 2200 to perform processes of the embodiments of the present invention or steps thereof. Such a program may be executed by a CPU 2212 so as to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data to be used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units to the input/output controller 2220 via a parallel port, a serial port, a keyboard port, a mouse port, and the like.

A program is provided by computer readable media such as the DVD-ROM 2201 or the IC card. The program is read from the computer readable media, installed into the hard disk drive 2224, the RAM 2214, or the ROM 2230, which are also examples of computer readable media, and is executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer 2200 or in the computer readable media near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 1 plant management system, 2 operation monitoring terminal, 11 field device, 13 operation controller, 14 alarm management apparatus, 20 input apparatus, display apparatus, 25 display controller, 100 control network, 101 network, 210 display area, 211 indicator image, 215 setting area, 216 setting area, 250 storage unit, 251 display condition setting unit, 252 obtainment and extraction unit, 254 selection unit, 255 detection unit, 256 display control unit, 2200 computer, 2201 DVD-ROM, 2210 host controller, 2212 CPU, 2214 RAM, 2216 graphics controller, 2218 display device, 2220 input/output controller, 2222 communication interface, 2224 hard disk drive, 2226 DVD-ROM drive, 2230 ROM, 2240 input/output chip, 2242 keyboard, 2511 position and size setting unit, 2512 attribute setting unit

What is claimed is:

1. A non-transitory computer readable medium having processor instructions stored thereon that, when executed, cause a processor to control a display comprising
    displaying, in a display area,
        text descriptions of one or more alarms corresponding only to a selected alarm display attribute; and
        an indicator image corresponding to the selected alarm display attribute as a watermark image such that the watermark image overlaps one or more of the text descriptions of the one or more alarms;
    displaying outside the display area, a plurality of alarm display attributes, the selected alarm display attribute being displayed among the plurality of alarm display attributes;
    wherein the one or more text descriptions of the one or more alarms overlapped by the watermark image are readable despite the watermark overlap.

2. The non-transitory, computer readable medium having processor instructions stored thereon according to claim 1, further comprising:
    obtaining the one or more alarms generated in a plant;
    detecting a communication failure on an alarm obtaining route; and
    displaying an indicator image corresponding to the communication failure in the display area in a case where the communication failure is detected.

3. The non-transitory, computer readable medium of claim 1, wherein
    a height of the watermark image is larger than a height of 1 line of the one or more of the text descriptions of the one or more alarms.

4. The non-transitory, computer readable medium of claim 1, further comprising
    scrolling the text descriptions of the one or more alarms without changing the position of the watermark image.

5. The non-transitory, computer readable medium of claim 1, further comprising
    changing one of the size and position of the indicator image in response to a change in the size of the display area.

6. The non-transitory, computer readable medium of claim 1, further comprising
    obtaining the one or more alarms from one of an operation controller and a field device.

7. The non-transitory, computer readable medium of claim 6, wherein
    the obtaining includes obtaining the one or more alarms over a wide area network.

8. The non-transitory, computer readable medium of claim 7, wherein the obtaining the one or more alarms over the wide area network includes obtaining the one or more alarms from a plurality of field devices.

9. The non-transitory computer readable medium of claim 1, wherein
the processor instructions reside in a display controller.

10. An apparatus comprising:
a display controller for displaying, in a display area, text descriptions of one or more alarms corresponding only to a selected alarm display; and
displaying, in the display area, an indicator image corresponding to the selected alarm display attribute as a watermark image such that the watermark image overlaps one or more of the text descriptions of the one or more alarms, wherein,
the one or more text descriptions of the one or more alarms overlapped by the watermarked image are readable despite the watermark overlap; and
displaying a plurality of alarm display attributes outside of the display area, the selected alarm display attribute being displayed among the plurality of alarm display attributes.

11. A non-transitory computer readable medium having processor instructions stored thereon that, when executed, cause a processor to:
select an indicator image corresponding to a display attribute which is set for a display area;
obtain an alarm generated in a plant;
display, in the display area, the alarm corresponding to the display attribute among alarms generated in the plant and also collectively displaying, in the display area, the selected indicator image, wherein the selected indicator image is displayed as a watermark image;
detect a communication failure on an alarm obtaining route; and
display an indicator image corresponding to the communication failure in the display area in a case where the communication failure is detected.

12. The non-transitory computer readable medium of claim 11, wherein
the processor instructions reside in a display controller.

13. An apparatus comprising
a display controller for
selecting an indicator image corresponding to a display attribute which is set for a display area;
obtaining an alarm generated in a plant;
displaying, in the display area, the alarm corresponding to the display attribute among alarms generated in the plant and also collectively displaying, in the display area, the selected indicator image, wherein the selected indicator image is displayed as a watermark image;
detecting a communication failure on an alarm obtaining route; and
displaying an indicator image corresponding to the communication failure in the display area in a case where the communication failure is detected.

* * * * *